(12) United States Patent
Daoud et al.

(10) Patent No.: US 6,259,852 B1
(45) Date of Patent: Jul. 10, 2001

(54) FIBER OPTIC PEDESTAL

(75) Inventors: Bassel H. Daoud, Parsippany; Christopher M. Helmstetter, Bridgewater; Garth A. Newell, Irvington, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/478,294

(22) Filed: Jan. 5, 2000

(51) Int. Cl.$^7$ .................................................. G02B 6/36
(52) U.S. Cl. ........................... 385/135; 385/134; 385/136
(58) Field of Search .................................. 385/134–139, 385/98, 99

(56) References Cited

U.S. PATENT DOCUMENTS 5,553,186 * 9/1996 Allen ..................................... 385/135

* cited by examiner

Primary Examiner—Phan T. H. Palmer
(74) Attorney, Agent, or Firm—Hedman & Costigan, PC

(57) ABSTRACT

A fiber optic pedestal for holding a plurality of fiber optic cable splices having at least one vertically disposed wall including a splice holder intermediate first and second engagement projections. The engagement projections having a surface for engaging fiber optic cable adjacent a splice which does not exceed the maximum bend radius of the cable. The pedestal is preferably formed with a fiber optic cable passageway on the interior of the at least one wall with the engagement projections located on the exterior of the walls. The pedestal further includes one or more radial openings for cable running through the passageway to pass to the first projection, the splice to be held in the splice holder and the continuing cable to engage the second projection and reenter the interior passageway through the one or more openings.

19 Claims, 3 Drawing Sheets

FIBER OPTIC PEDESTAL

FIELD OF THE INVENTION

The invention relates to devices for holding fiber optic cable and splices.

BACKGROUND OF THE INVENTION

Fiber optic cables are widely used for voice and data transmission over long distances. However, fiber optic cable has physical limitations, most notably the bending it can withstand without failure. The limitation on the bending that a fiber optic cable can withstand prior to failure is known as the maximum bend radius.

Additionally, splicing fiber optic cable has its own limitations. Splicing is a precise job where the cable must be properly aligned to optimize performance of the optic cable. Moreover, splices formed when joining terminal ends of fiber optic cable have their own physical limitations wherein a splice creates an enlarged diameter connection which has virtually no bend capability. Therefore, the area of the optic fiber entering and leaving a splice is more susceptible to breakage from bending.

Due to these physical limitations, special devices have been created to maintain fiber optic splices which limit stress on the fiber. A common device for maintaining multiple fiber optic splices is a splice tray. A fiber optic cable enters the splice tray, winds about the perimeter at radii not less than the maximum bend radius with the splice positioned on a splice holder affixed to the splice tray. An example of a known splice tray is illustrated in FIGS. 1 and 1A.

However, the splice tray of the prior art has various limitations. These include the horizontal nature of the tray which creates size issues and a lack of means to hold the fiber optic cable to the tray, where mere gravity is generally used. Also the tray is limited in the number of slots on the splice holder for holding splices.

BRIEF DESCRIPTION OF THE DRAWINGS

The attached drawings, in which like reference characters indicate like parts, are included merely to better illustrate the present invention without limiting the invention in any manner whatsoever.

SUMMARY OF THE INVENTION

Benefits over the prior art are achieved by the present invention directed to a fiber optic pedestal for holding fiber optic cable splices comprising at least one substantially vertically disposed wall having a splice holder intermediate a first engagement projection and a second engagement projection, said engagement projections having surfaces for engaging fiber optic cable, said surfaces being not less than a maximum bend radius of a fiber optic cable engaged thereby.

The preferred pedestal includes a plurality of walls having splice holders intermediate first and second engagement projections thereon. The walls are preferably operatively connected at their lateral edges to form an open pedestal.

Most preferably, the pedestal comprises from 4 to 6 vertical walls operatively connected at their lateral edges, each having the arrangement of a splice holder intermediate first and second engagement projections. The preferred pedestal is open at the top and bottom to allow cable to pass therethrough. It also has openings adjacent the engagement projections to allow cable passing through the top and bottom of the pedestal to pass to the exterior walls which preferably have the splice holders and engagement projections associated therewith.

Finally, the pedestal has a narrowed portion at one end, and preferably the top, to provide for a positive engagement when multiple pedestals are arranged in a stacked relationship for maintaining a larger volume of cables and splices.

DETAILED DESCRIPTION OF THE PREFERRED EMBODIMENT

Figure 1:
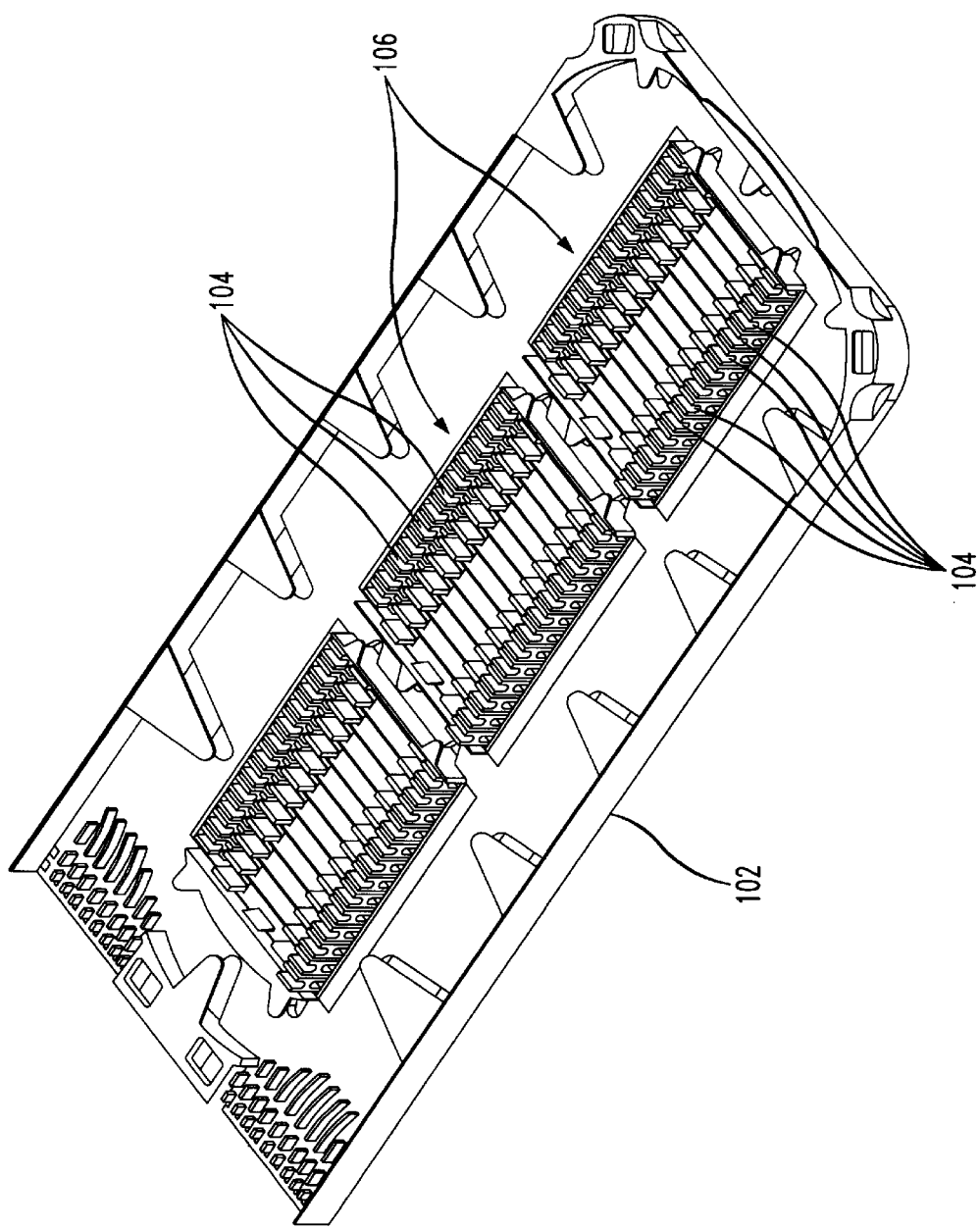
FIG. 1 is a perspective view of a fiber optic splice tray of the prior art.
Figure 1A:
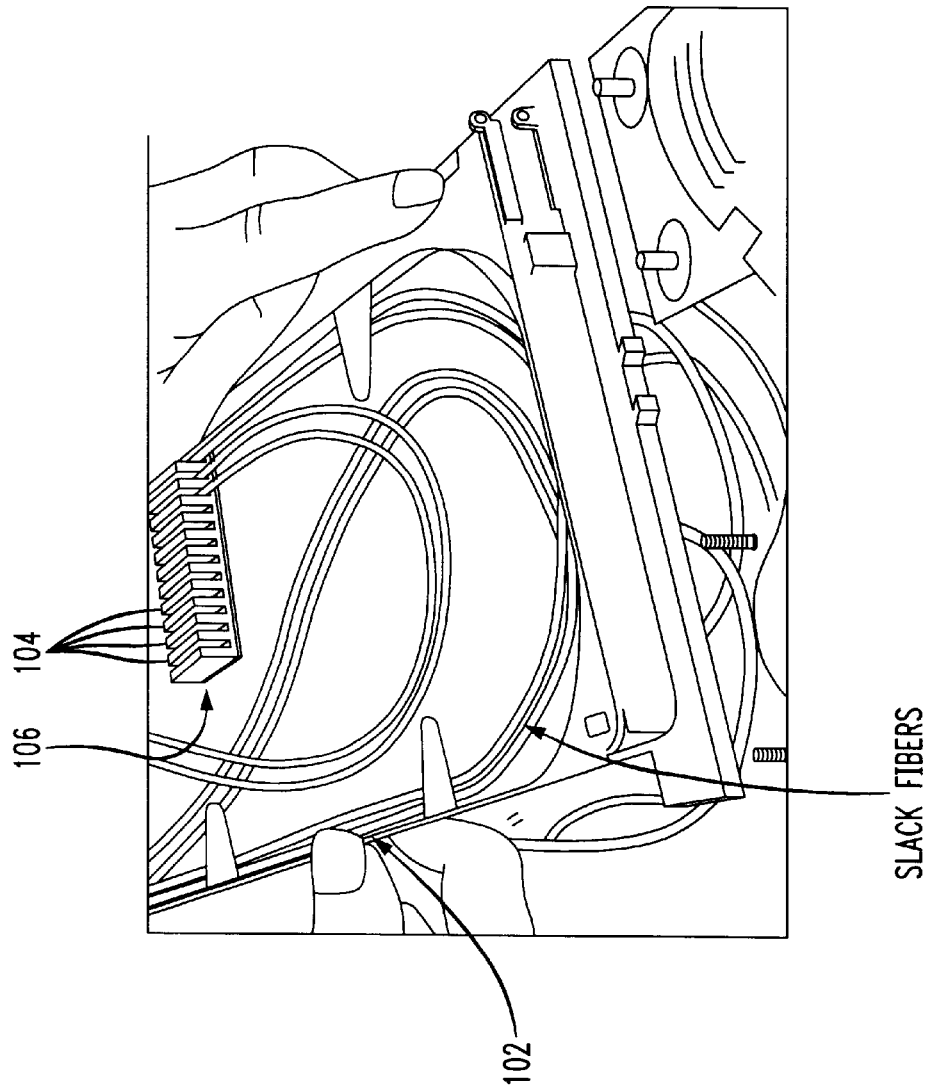
FIG. 1A is a partial perspective view of a fiber optic splice tray of the prior art with fiber optic cable thereon.

As shown in FIG. 1, the prior art devices for maintaining fiber optic cable splices comprises a horizontal tray 102. The fiber optic cable is laid in an oval or "figure 8" configuration with the splice placed within slots 104 on a splice holder 106 with a friction fit.

In the present invention, comprising a vertical pedestal 2, the fiber optic cable and splices thereon are held on a vertical wall 4 of the pedestal 2 having a splice holder 6 attached to the vertical wall 4 intermediate a first engagement projection 8 and a second engagement projection 10. Preferably, the pedestal 2 has a plurality of vertical walls 4 having a splice holder 6 intermediate first and second engagement projections 8 and 10.

The shape of the pedestal may be dependent on the number of walls 4 in the preferred embodiment. From 1 to about 10 walls could be used. A single wall 4 would be in a circular shape, two walls in an eye shape, three walls in a triangular shape, etc. However, 4–6 walls operatively connected at their lateral edges to form a square, pentagon or hexagon are most preferred to maximize the number of cables and splices held while providing a structure which can be used in small spaces with sufficient room for a technician to work on the fiber and splices.

When a plurality of operatively connected walls are used to form the pedestal 2, it is preferred that the interior of the pedestal is hollow, with the top 12 and bottom 14 of the pedestal open to allow optic fiber cable to pass therethrough. In this preferred embodiment, the pedestal 2 has lateral openings 14 to allow the fiber optic cable passing through the middle of the pedestal 2 to move the exterior of the pedestal 2 where the splice is held on the splice holder 6, and the adjacent engagement projections 8 and 10 and back to the interior of the pedestal. Most preferably, the opening 14 is a slot which extends adjacent the engagement projections 8 and 10.

Figure 2:
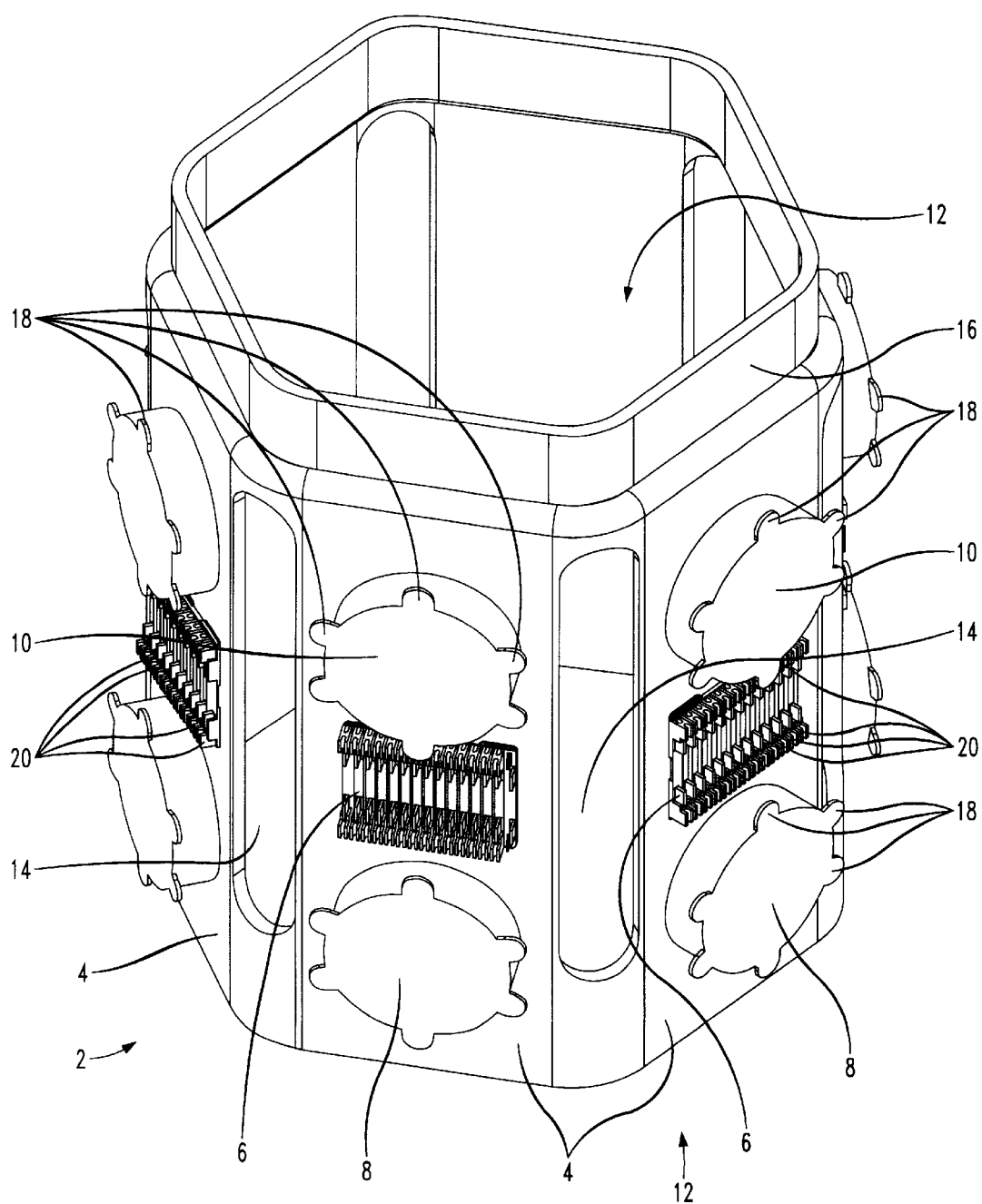
FIG. 2 is a perspective view of the fiber optic pedestal of the present invention.

Most preferably, the pedestal 2 includes a reduced perimeter portion 16 at either the top 12 or bottom 14 of the pedestal to allow multiple pedestals 2 to be stacked in a positive attachment configuration by a friction fit with an adjacent pedestal 2. As shown in FIG. 2 it is preferred that the reduced diameter perimeter 16 occurs at the top 12 of the pedestal 2 to provide a more stable base when the pedestal is placed on a surface.

It is also understood that a surface on which the pedestal 2 of the invention is to be mounted may, but need not, have a raised portion generally conforming to the reduced perimeter 16 of a pedestal 2, to secure the pedestal 2 to the surface.

The engagement projections 8 and 10 can be any rounded shape which does not exceed the maximum bend radius. In its preferred embodiment, however, the engagement projections 8 and 10 are circular and have a diameter of not less than the maximum bend radius of the fiber optic cable. Preferably, the engagement projections 8 and 10 have one or more retention members 18 extending substantially radially from the outer end of the projections 8 and 10 which keep the optic fiber from sliding off of the engagement projections 8 and 10. In its most preferred arrangement, shown in FIG. 2, each engagement projection 8 and 10 has a plurality of retention members 18 in the form of tabs spaced apart about the circumference of the circular engagement projections 8 and 10. The engagement projections 8 and 10 preferably extend about ⅛ to about ½ inch from the wall 4 to hold windings of the fiber optic cable. Similarly, the retention members 18 preferably extend about ⅛ to about ½ inch substantially radially outwardly from the engagement projections 8 and 10 to retain said optic fiber cable windings on the projections 8 and 10.

The splice holders 6 can be any known device capable of retaining fiber optic cable splices as are well known in the art. Preferably, the splice holder 6 is made of rubber or a material with like characteristics, having slots between multiple flexible arms 20 extending substantially outwardly from a base in sequential order. The base of the splice holder 6 is adhered or affixed to the wall 4 intermediate the projections 8 and 10 and the splices are friction fit in the slots between the flexible arms 20.

In it most preferred embodiment, the distances between the ends of the flexible arms 20 are less than the distances between the middles of the flexible arms 20 so that the splices move into and are affirmatively engaged by the flexible arms 20. In the preferred embodiment shown in FIG. 2, the splice holder 6 includes a pair of flexible arms 20 for each splice being held, corresponding generally to the ends of each splice, with the middle of the splice exposed between the pair of flexible arms 20 to allow a technician to grasp the middle of the splice for insertion/removal.

To provide a minimum of unnecessary bending of the fiber optic cables entering and leaving the engagement projections 8 and 10, the splice holder 6 is arranged so that the splices run substantially in the direction of from the first engagement projection 8 to the second engagement projection 10. In this regard, the direction of the splices in the splice holder 6 between the engagement projections 8 and 10 is more important than the arrangement of the engagement projections 8 and 10 in vertical, horizontal or diagonal configurations. Of course, any configuration of the projections would be acceptable with the illustrated vertical configuration being most preferred.

The openings 14 on the body of the pedestal 2 can be any suitable shape and size, however, slots corresponding to the sides of the pair of engagement projections 8 and 10 are most preferred. Generally, a slot on each side of the pair of engagement projections 8 and 10, extending at least to the opposed ends of the engagement projections 8 and 10, is most preferred.

The pedestal is preferably made of plastic and most preferably of polycarbonate by injection molding. It has been found to be suitable to provide a pedestal 2 which is about 6–10 inches tall having 6 walls 4 in a hexagonal configuration, each wall 4 being about 2–4 inches wide to accommodate engagement projections 8 and 10 of about 1½ to 3 inches in diameter. Of course, more than one arrangement of a splice holder 6 intermediate two engagement projections 8 and 10 can be placed on one wall 4 if the pedestal 2 is made higher or if the walls 4 are made wider.

Variations and modifications of the present invention will make themselves apparent to one skilled in the art reviewing the present disclosure. All such variations and modifications are contemplated by the present invention, limited only by the appended claims.

What is claimed is:

1. A fiber optic pedestal for holding a plurality of fiber optic cable splices comprising a plurality of substantially vertically disposed walls attached along at least a portion of the lateral edges of the walls, at least one of said walls including a splice holder intermediate a first engagement projection and a second engagement projection said engagement projections extending substantially outwardly from said wall and having surfaces for engaging fiber optic cable which are not less than a maximum bend radius of the fiber optic cable on the exterior of said at least one wall.

2. The fiber optic pedestal as defined in claim 1 wherein more than one of said walls include a splice holder intermediate a first engagement projection and a second engagement projection.

3. The fiber optic pedestal as defined in claim 2 comprising from about 1 to about 10 walls.

4. The fiber optic pedestal as defined in claim 3 wherein each of said walls includes a splice holder intermediate first and second engagement projections disposed on the exterior of said walls.

5. The fiber optic pedestal of claim 3 wherein an interior is defined within said walls, said interior having an axial passageway to allow fiber optic cable to pass axially through the pedestal.

6. The fiber optic pedestal of claim 5 further comprising one or more openings from the interior passageway of the pedestal to the exterior of the pedestal adjacent the first and second engagement projections to allow optic fiber to pass to and from the interior of the pedestal to the splice holders and projections and back to the interior passageway.

7. The fiber optic pedestal as defined in claim 6 wherein the one or more openings comprise slots which run substantially parallel to and adjacent the first and second engagement projections.

8. The fiber optic pedestal as defined in claim 1 wherein the engagement projections further comprise at least one retention member extending substantially radially outwardly from said engagement projection.

9. The fiber optic pedestal as defined in claim 8 wherein each engagement projection includes a plurality of retention members.

10. The fiber optic pedestal as defined in claim 1 wherein the splice holder is adhered to the wall.

11. The fiber optic pedestal as defined in claim 1 wherein the engagement projections are substantially circular projections having a diameter of not less than a maximum bend radius of the fiber optic cable.

12. The fiber optic pedestal as defined in claim 2 wherein the splice holder is oriented so that the splices run substantially in the direction of from said first engagement projection to said second engagement projection.

13. The fiber optic pedestal as defined in claim 2 wherein the first and second engagement projections are oriented substantially vertically, one above the other, on said wall with said splice holder intermediate thereto.

14. The fiber optic pedestal of claim 1 further comprising a reduced perimeter portion at one end of the pedestal to provide for stacking of a plurality of pedestals.

15. A fiber optic pedestal for holding a plurality of fiber optic cable splices comprising a plurality of substantially vertical walls formed about a perimeter, the area within the perimeter being substantially open to allow fiber optic cable to pass therethrough, at least one of said walls having an exterior comprising a splice holder intermediate a first engagement projection and a second engagement projection, said pedestal further comprising at least one radial opening adjacent said projections.

16. The fiber optic pedestal as defined in claim 15 wherein said engagement projections further comprise one or more retention members.

17. The fiber optic pedestal as defined in claim 15 wherein said splice holder comprises a plurality of means for holding fiber optic splices operatively adhered to the exterior of said wall.

18. The fiber optic pedestal as defined in claim 15 wherein the walls terminate in a top portion which has a reduced perimeter to allow stacking of multiple pedestals.

19. The fiber optic pedestal as defined in claim 15 wherein the first and second projections and walls of the pedestal are integrally formed of plastic and the splice holder is adhered to the walls intermediate the first and second projections.

* * * * *